US012537129B2

(12) United States Patent
Masuda et al.

(10) Patent No.: US 12,537,129 B2
(45) Date of Patent: Jan. 27, 2026

(54) COIL COMPONENT

(71) Applicant: Murata Manufacturing Co., Ltd., Kyoto-fu (JP)

(72) Inventors: Yukinobu Masuda, Nagaokakyo (JP); Takuma Sagara, Nagaokakyo (JP); Shingo Nakamoto, Nagaokakyo (JP); Ryota Hashimoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 610 days.

(21) Appl. No.: 18/150,341

(22) Filed: Jan. 5, 2023

(65) Prior Publication Data

US 2023/0215619 A1 Jul. 6, 2023

(30) Foreign Application Priority Data

Jan. 5, 2022 (JP) ................................ 2022-000595

(51) Int. Cl.
*H01F 27/29* (2006.01)
*H01F 27/30* (2006.01)

(52) U.S. Cl.
CPC ......... *H01F 27/292* (2013.01); *H01F 27/306* (2013.01)

(58) Field of Classification Search
CPC ............................. H01F 27/292; H01F 27/306
See application file for complete search history.

(56) References Cited

U.S. PATENT DOCUMENTS

| | | | | |
|---|---|---|---|---|
| 7,256,673 B2 * | 8/2007 | Okumura | H01F 27/292 336/200 |
| 2004/0263285 A1 * | 12/2004 | Suzuki | H01F 41/082 333/185 |
| 2018/0211764 A1 * | 7/2018 | Komaya | H01F 17/04 |
| 2018/0277926 A1 * | 9/2018 | Park | H01Q 1/2283 |
| 2018/0366259 A1 * | 12/2018 | Mikogami | H01F 41/06 |
| 2020/0211750 A1 * | 7/2020 | Miyamoto | H01F 17/045 |
| 2021/0065954 A1 * | 3/2021 | Kawasaki | H01F 27/2828 |

FOREIGN PATENT DOCUMENTS

| | | | |
|---|---|---|---|
| JP | 2019135763 A * | 8/2019 | H01F 27/2823 |
| JP | 2020-109789 A | 7/2020 | |
| JP | 2021-039986 A | 3/2021 | |

* cited by examiner

*Primary Examiner* — Malcolm Barnes
(74) *Attorney, Agent, or Firm* — Studebaker Brackett PLLC

(57) ABSTRACT

A coil component includes a core including a winding core portion and flange portions; wires wound around the winding core portion; and terminal electrodes on the respective flange portions. The wires respectively have flattened portions connected to the terminal electrodes. The flattened portions each have a shape that becomes thinner from the winding core portion toward a tip end of a corresponding one of the wires. When viewed from a side where mounting surfaces are located, a center axis of a part of each of the flattened portions closer to the winding core portion and a center axis of a part of a corresponding one of the flattened portions closer to the tip end extend in different directions. The center axis of the part of each of the flattened portions closer to the tip end extends in a direction parallel to an axial direction.

20 Claims, 7 Drawing Sheets

COIL COMPONENT

CROSS-REFERENCE TO RELATED APPLICATION

This application claims benefit of priority to Japanese Patent Application No. 2022-000595, filed Jan. 5, 2022, the entire content of which is incorporated herein by reference.

BACKGROUND

Technical Field

The present disclosure relates to a winding coil component having a structure in which a wire is wound around a core and, in particular, to the structure of the part where the wire and a terminal electrode are connected.

Background Art

For example, Japanese Unexamined Patent Application Publication No. 2021-39986 describes a winding coil component forming a common mode choke coil in which respective end portions of two wires are connected to four terminal electrodes.

More specifically, the coil component includes a core and two wires. The core includes a winding core portion and flange portions. The winding core portion extends in the axial direction. The flange portions are provided at respective end portions of the winding core portion located opposite to each other in the axial direction. The two wires are wound around the winding core portion.

The flange portions each have a mounting surface, a top surface, an inner end surface, an outer end surface, a first side surface, and a second side surface. The mounting surface faces, when the coil component is mounted on a mounting substrate, the side where the mounting substrate is located. The top surface faces the side opposite to the side that the mounting surface faces. The inner end surface connects the mounting surface and the top surface and faces the side where the winding core portion is located, and an end portion of the winding core portion in the axial direction is located at the inner end surface. The outer end surface faces the side opposite to the side that the inner end surface faces. The first side surface and the second side surface connect the inner end surface and the outer end surface and face respective directions opposite to each other.

Two terminal electrodes are provided on each flange portion so as to be arranged in the width direction. The terminal electrodes extend from the mounting surface to the outer end surface of the flange portion.

The wires are extended from the winding core portion and are connected to the respective terminal electrodes by thermocompression bonding. The thermocompression bonding causes the end portions of the wires extended from the winding core portion to each have a shape flattened such that the direction of the major axis thereof is along the mounting surface.

SUMMARY

FIG. 10 is a copy of FIG. 1B in Japanese Unexamined Patent Application Publication No. 2021-39986. With reference to FIG. 10, description will be given by borrowing reference signs used in FIG. 1B in Japanese Unexamined Patent Application Publication No. 2021-39986. The end portions of the wires extended from the winding core portion are connected to respective terminal electrodes 41 and 42 by thermocompression bonding. The end portions of the wires have respective flattened portions 311 and 321, each of which has a shape flattened such that the direction of the major axis thereof is along a mounting surface **14*a* of the flange portion. The flattened portions 311 and 321 are located on electrode portions 410 and 420 of the terminal electrodes 41 and 42, the electrode portions 410 and 420 being formed on the mounting surface 14*a*** of the flange portion.

Description will be given by focusing on the shapes and the positions of the flattened portions 311 and 321 forming the end portions of the wires. When viewed from the side where the mounting surface **14*a* is located, the flattened portions 311 and 321 are directed in respective directions that are the same as the directions in which the wires are extended from the winding core portion. More specifically, the flattened portions 311 and 321 are disposed on the electrode portions 410 and 420 of the terminal electrodes 41 and 42, the electrode portions 410 and 420 being formed on the mounting surface 14*a*, such that the flattened portions 311 and 321 traverse the electrode portions 410 and 420 in a diagonal direction or an oblique direction. To put it in extreme terms, the flattened portions 311 and 321 occupy substantially the entire areas of the electrode portions 410 and 420 of the terminal electrodes 41 and 42, the electrode portions 410 and 420 being formed on the mounting surface 14*a***.

The terminal electrodes 41 and 42 of the coil component having the structure illustrated in FIG. 10 are to be not only connected to wires but also subjected to soldering when the coil component is mounted on a mounting substrate. To achieve satisfactory soldering when the coil component is mounted on a mounting substrate, it is important to form solder fillets on parts of the terminal electrodes 41 and 42 extending to the outer end surface of the flange portion and to sufficiently spread solder on the electrode portions 410 and 420 of the terminal electrodes 41 and 42, the electrode portions 410 and 420 being formed on the mounting surface **14*a*** of the flange portion.

However, as described above, when the flattened portions 311 and 321 occupy large areas of the electrode portions 410 and 420 of the terminal electrodes 41 and 42, the electrode portions 410 and 420 being formed on the mounting surface **14*a*, satisfactory soldering may be hindered in the case in which the coil component is mounted on a mounting substrate. For example, the flattened portions 311 and 321 on the electrode portions 410 and 420 change the surface state of the electrode portions 410 and 420 and thus may hinder satisfactory soldering. In addition, it is not possible to ignore the fact that a resin that is a material for an insulating coating provided to each wire is scattered on the peripheries of the flattened portions 311 and 321** during thermocompression bonding and thus hinders satisfactory soldering.

Accordingly, the present disclosure provides a coil component capable of ensuring achievement of a satisfactory soldering state when being mounted.

The present disclosure is directed to a coil component including a core including a winding core portion, a first flange portion, and a second flange portion; and at least one wire wound around the winding core portion. The winding core portion extends in an axial direction. The first flange portion and the second flange portion are provided at respective end portions of the winding core portion located opposite to each other in the axial direction.

The first flange portion and the second flange portion each have a mounting surface, a top surface, an inner end surface, an outer end surface, a first side surface, and a second side surface. The mounting surface faces, when the coil component is mounted on a mounting substrate, a side where the mounting substrate is located. The top surface faces a side opposite to the side that the mounting surface faces. The inner end surface connects the mounting surface and the top surface and faces a side where the winding core portion is located, and an end portion of the winding core portion in the axial direction is located at the inner end surface. The outer end surface faces a side opposite to the side that the inner end surface faces. The first side surface and the second side surface connect the inner end surface and the outer end surface and face respective directions opposite to each other.

The coil component further includes: a first terminal electrode provided on at least the mounting surface of the first flange portion; and a second terminal electrode provided on at least the mounting surface of the second flange portion.

The wire has a first end portion extended from the winding core portion. A first flattened portion is provided in at least a part of the first end portion and is connected to one of the first terminal electrode and the second terminal electrode. The first flattened portion has a shape flattened such that a direction of a major axis of a sectional shape of the first flattened portion is directed in a direction along the mounting surface.

In a first aspect of the present disclosure, the coil component having the basic configuration described above further has the following configuration.

A slope is provided at a boundary portion between the mounting surface and the inner end surface of the first flange portion and extends so as to connect a first middle position and a second middle position, the first middle position being located between the inner end surface and the outer end surface in a direction along the mounting surface, the second middle position being located between the mounting surface and the top surface in a direction along the inner end surface.

The first flattened portion has a shape that becomes thinner from the winding core portion toward a tip end of the wire.

When viewed from the side where the mounting surface is located, a center axis of a part of the first flattened portion closer to the winding core portion and a center axis of a part of the first flattened portion closer to the tip end extend in different directions.

In a second aspect of the present disclosure, the coil component having the basic configuration described above further has the following configuration.

When viewed from the side where the mounting surface is located, a center axis of a part of the first flattened portion closer to the winding core portion and a center axis of a part of the first flattened portion closer to the tip end extend in different directions, and the center axis of the part of the first flattened portion closer to the tip end extends in a direction parallel to the axial direction.

In the coil component having the basic configuration described above, the first flattened portion is located at the first end portion of the wire extended in an oblique direction relative to the axial direction when viewed from the side where the mounting surface is located. Thus, if the extended direction from the winding core portion is maintained, the first flattened portion is disposed so as to traverse the terminal electrode located on the mounting surface in a diagonal direction, that is, so as to occupy an area across the terminal electrode in a width direction. Accordingly, it is difficult for a substrate mounting portion to be connected to the mounting substrate to have a wide area in the terminal electrode. As described below, the present disclosure is intended to improve the extended direction of the first flattened portion that may have such a disadvantage.

According to the present disclosure, in any one of the first aspect and the second aspect, when viewed from the side where the mounting surface is located, the center axis of the part of the first flattened portion closer to the winding core portion and the center axis of the part of the first flattened portion closer to the tip end extend in different directions. Thus, it is possible to freely select an orientation and a position of the part of the first flattened portion closer to the tip end. Such selection of an orientation and a position of the part of the first flattened portion closer to the tip end enables the substrate mounting portion to be connected to the mounting substrate to have a wide area in the terminal electrode.

In particular, according to the second aspect of the present disclosure, the center axis of the part of the first flattened portion closer to the tip end extends in the direction parallel to the axial direction. Thus, it is possible to avoid disposing the first flattened portion so as to traverse the terminal electrode located on the mounting surface in a diagonal direction.

DETAILED DESCRIPTION

Figure 1:
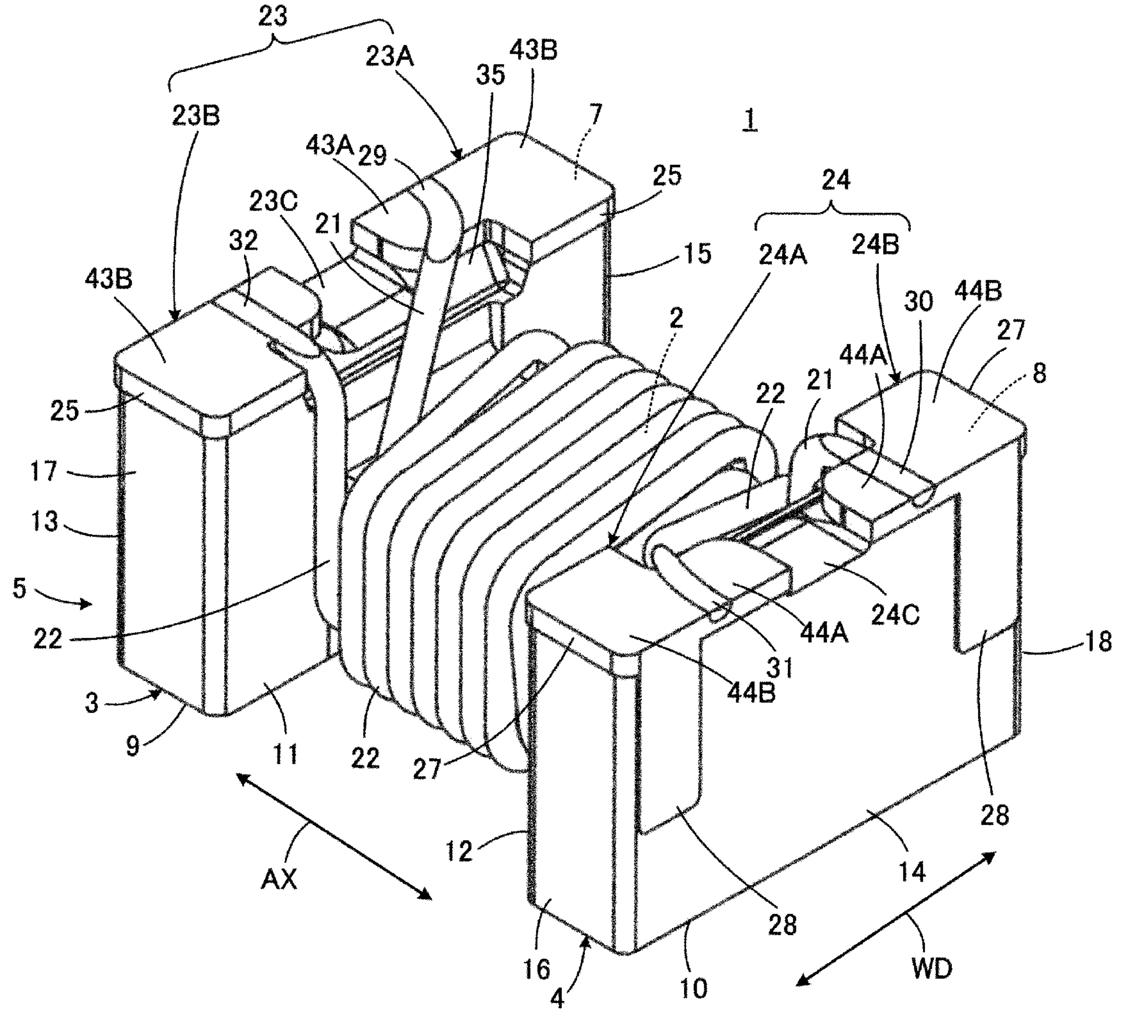
FIG. 1 is a perspective view illustrating the exterior of a coil component 1 according to Embodiment 1 of the present disclosure when mounting surfaces 7 and 8 face upward.

A coil component 1 according to Embodiment 1 of the present disclosure will be described with reference to FIGS. 1 to 6.

The coil component 1 includes a core 5. The core 5 has a drum shape and includes a winding core portion 2, which extends in an axial direction AX, and a first flange portion 3 and a second flange portion 4, which are provided at respective end portions of the winding core portion 2 located opposite to each other in the axial direction AX. The core 5 is made of, for example, a resin containing ferrite, alumina, ferrite powder, or metal magnetic powder. The cross-sectional shape of the winding core portion 2 illustrated in the figures is, for example, a quadrilateral but may be a polygon such as a hexagon, a round shape, an ellipse, or a combination of these shapes.

The first flange portion 3 has a mounting surface 7, a top surface 9, an inner end surface 11, an outer end surface 13, a first side surface 15, and a second side surface 17. The mounting surface 7 faces, when the coil component 1 is mounted on a mounting substrate, the side where the mounting substrate is located. The top surface 9 faces the side opposite to the side that the mounting surface 7 faces. The inner end surface 11 connects the mounting surface 7 and the top surface 9 and faces the side where the winding core portion 2 is located, and an end portion of the winding core portion 2 in the axial direction AX is located at the inner end surface 11. The outer end surface 13 faces the side opposite to the side that the inner end surface 11 faces. The first side surface 15 and the second side surface 17 connect the inner end surface 11 and the outer end surface 13 and face respective directions opposite to each other.

Similarly, the second flange portion 4 has a mounting surface 8, a top surface 10, an inner end surface 12, an outer end surface 14, a first side surface 16, and a second side surface 18. The mounting surface 8 faces, when the coil component 1 is mounted on a mounting substrate, the side where the mounting substrate is located. The top surface 10 faces the side opposite to the side that the mounting surface 8 faces. The inner end surface 12 connects the mounting surface 8 and the top surface 10 and faces the side where the winding core portion 2 is located, and an end portion of the winding core portion 2 in the axial direction AX is located at the inner end surface 12. The outer end surface 14 faces the side opposite to the side that the inner end surface 12 faces. The first side surface 16 and the second side surface 18 connect the inner end surface 12 and the outer end surface 14 and face the respective directions opposite to each other.

The coil component 1 forms, for example, a common mode choke coil and includes a first wire 21 and a second wire 22, which are wound around the winding core portion 2 of the core 5. As is generally known, the first wire 21 and the second wire 22 of the common mode choke coil are wound around the winding core portion 2 in the same direction. In the example illustrated in the figures, the first wire 21 is wound around the winding core portion 2 so as to be in contact with the winding core portion 2, and the second wire 22 is wound around the winding core portion 2 so as to be in contact with the periphery of the first wire 21. The wires 21 and 22 each include a center wire material that is made of a highly conductive metal such as copper, silver, or gold, and an insulating coating that covers the center wire material and that is made of an electrically insulating resin such as a polyamide-imide resin, a polyurethane resin, or a polyester imide resin.

First terminal electrodes 23 are provided on the first flange portion 3. Second terminal electrodes 24 are provided on the second flange portion 4. When the direction in which the mounting surfaces 7 and 8 extend and that is orthogonal to the axial direction AX of the winding core portion 2 is a width direction WD, the two first terminal electrodes 23 are provided on the first flange portion 3 so as to be separate from each other and to be arranged in the width direction WD, and the two second terminal electrodes 24 are provided on the second flange portion 4 so as to be separate from each other and to be arranged in the width direction WD. Hereinafter, when the two first terminal electrodes 23 are distinguished from each other, one first terminal electrode is assigned a reference sign "23A", and the other first terminal electrode is assigned a reference sign "23B". In addition, when the two second terminal electrodes 24 are distinguished from each other, one second terminal electrode is assigned a reference sign "24A", and the other second terminal electrode is assigned a reference sign "24B".

The first terminal electrodes 23A and 23B each include a first main portion 25, which is located on the mounting surface 7 of the first flange portion 3, and a first end surface electrode portion 26, which extends from the mounting surface 7 to the outer end surface 13. Similarly, the second terminal electrodes 24A and 24B each include a second main portion 27, which is located on the mounting surface 8 of the second flange portion 4, and a second end surface electrode portion 28, which extends from the mounting surface 8 to the outer end surface 14.

For example, each undercoating of the first main portion 25 and the second main portion 27 is formed by baking a silver paste, and each undercoating of the first end surface electrode portion 26 and the second end surface electrode portion 28 is formed by silver deposition. Then, a Cu coating, a Ni coating, and a Sn coating are formed in this order so as to cover the undercoating of the first main portion 25 and the undercoating of the first end surface electrode portion 26 in series and to cover the undercoating of the second main portion 27 and the undercoating of the second end surface electrode portion 28 in series.

A recessed portion 23C, which partitions off the first terminal electrodes 23A and 23B, is provided on the mounting surface 7 of the first flange portion 3. A recessed portion 24C, which partitions off the second terminal electrodes 24A and 24B, is provided on the mounting surface 8 of the second flange portion 4.

The terminal electrodes 23 and 24 may be each formed by a terminal member made of a metal plate.

A first end portion and a second end portion of the first wire 21 are respectively connected to the first terminal electrode 23A and the second terminal electrode 24B by thermocompression bonding. A first end portion and a second end portion of the second wire 22 are respectively connected to the second terminal electrode 24A and the first terminal electrode 23B by thermocompression bonding. The insulating coatings of the wires 21 and 22 are removed as a result of the thermocompression bonding.

More specifically, the first wire 21 has the first end portion, a first flattened portion 29, the second end portion, and a second flattened portion 30. The first end portion is extended from the winding core portion 2 so as to traverse the center axis of the winding core portion 2 in an oblique direction relative to the axial direction AX when viewed from the side where the mounting surfaces 7 and 8 are located. The first flattened portion 29 is formed in at least a part of the first end portion, has a shape flattened such that the direction of the major axis of a sectional shape thereof is directed in a direction along the mounting surface 7, and is connected to the first terminal electrode 23A. The second end portion is extended from the winding core portion 2 in the direction along the axial direction AX when viewed from the side where the mounting surfaces 7 and 8 are located. The second flattened portion 30 is formed in at least a part of the second end portion, has a shape flattened such that the direction of the major axis of a sectional shape thereof is directed in a direction along the mounting surface 8, and is connected to the second terminal electrode 24B.

Similarly, the second wire 22 has the first end portion, a first flattened portion 31, the second end portion, and a second flattened portion 32. The first end portion is extended from the winding core portion 2 so as to traverse the center axis of the winding core portion 2 in an oblique direction relative to the axial direction AX when viewed from the side where the mounting surfaces 7 and 8 are located. The first flattened portion 31 is formed in at least a part of the first end portion, has a shape flattened such that the direction of the major axis of a sectional shape thereof is directed in a direction along the mounting surface 8, and is connected to the second terminal electrode 24A. The second end portion is extended from the winding core portion 2 in the direction along the axial direction AX when viewed from the side where the mounting surfaces 7 and 8 are located. The second flattened portion 32 is formed in at least a part of the second end portion, has a shape flattened such that the direction of the major axis of a sectional shape thereof is directed in a direction along the mounting surface 7, and is connected to the first terminal electrode 23B.

In the configuration illustrated in the figures, each of the second end portions of the first wire 21 and the second wire 22 is extended from the winding core portion 2 so as to be parallel to the axial direction AX when viewed from the side where the mounting surfaces 7 and 8 are located but does not have to be strictly parallel thereto.

The first flattened portions 29 and 31 and the second flattened portions 30 and 32 are formed as a result of thermocompression bonding in which the respective end portions of the wires 21 and 22 are pressed with a heater chip against the terminal electrodes 23 and 24. The first flattened portions 29 and 31 and the second flattened portions 30 and 32 each have a shape that becomes thinner from the winding core portion 2 toward the corresponding tip end of the wire 21 or 22. The following configuration is employed to facilitate formation of such a shape.

The first flange portion 3 and the second flange portion 4 have substantially the same shape. First, the first flange portion 3 will be described. A slope 35 is provided at a boundary portion between the mounting surface 7 and the inner end surface 11 of the first flange portion 3. The slope 35 extends so as to connect a first middle position 33 (see FIGS. 4 to 6), which is located between the inner end surface 11 and the outer end surface 13 in a direction along the mounting surface 7, and a second middle position 34 (see FIGS. 4 to 6), which is located between the mounting surface 7 and the top surface 9 in a direction along the inner end surface 11.

Similarly, a slope 39 is provided at a boundary portion between the mounting surface 8 and the inner end surface 12 of the second flange portion 4. The slope 39 extends so as to connect a first middle position 37 (see FIG. 6), which is located between the inner end surface 12 and the outer end surface 14 in a direction along the mounting surface 8, and a second middle position 38 (see FIG. 6), which is located between the mounting surface 8 and the top surface 10 in a direction along the inner end surface 12.

When thermocompression bonding is applied to connect the wires 21 and 22 to the terminal electrodes 23 and 24, the wires 21 and 22 are deformed so as to follow the slopes 35 and 39. Thus, as described above, it is possible to easily form the first flattened portions 29 and 31 and the second flattened portions 30 and 32 each having a shape that becomes thinner from the winding core portion 2 toward the corresponding tip end of the wire 21 or 22.

Here, each part of the first flattened portions 29 and 31 that faces the part from the second middle position 34 to the first middle position 33 has a shape that becomes thinner toward the corresponding tip end. Each part of the second flattened portions 30 and 32 that faces the part from the second middle position 38 to the first middle position 37 has a shape that becomes thinner toward the corresponding tip end.

The parts, over the slope 35 or 39, of the first flattened portions 29 and 31 and the second flattened portions 30 and 32 each have a shape that becomes thinner from the winding core portion 2 toward the corresponding tip end of the wire 21 or 22, thus enabling the diameter of each of the wires 21 and 22 not to change sharply from the respective tip ends of the flattened portions 29 to 32 toward the winding core portion 2. This enables the wires 21 and 22 to be less likely to be cut at the end portions of the flattened portions 29 to 32 closer to the winding core portion 2.

The diameter of each of the parts, over the winding core portion 2, of the wires 21 and 22 is preferably 100 μm or more and 300 μm or less (i.e., from 100 μm to 300 μm). Generally, when a wire having a diameter of 100 μm or more is connected to a terminal electrode located on a mounting surface of a flange portion, the cross section of the wire changes sharply and greatly, thus causing stress to be likely to be concentrated. Accordingly, the wire is likely to be cut. In contrast to this, formation of the shapes of the flattened portions 29 to 32 as described above enables the wires 21 and 22 to be connected to the terminal electrodes 23 and 24 so as to have stable strength. On the other hand, the wires 21 and 22 having a diameter of 300 μm or less facilitate pressure control and time control in a thermocompression bonding process.

The preferable range of the diameter of each of the parts, over the winding core portion 2, of the wires 21 and 22 can also be determined from the length of the winding core portion 2 in the axial direction AX. More specifically, the diameter of each of the parts, over the winding core portion 2, of the wires 21 and 22 is preferably 5% or more and 15% or less (i.e., from 5% to 15%) of the length of the winding core portion 2 in the axial direction AX.

Figure 2:
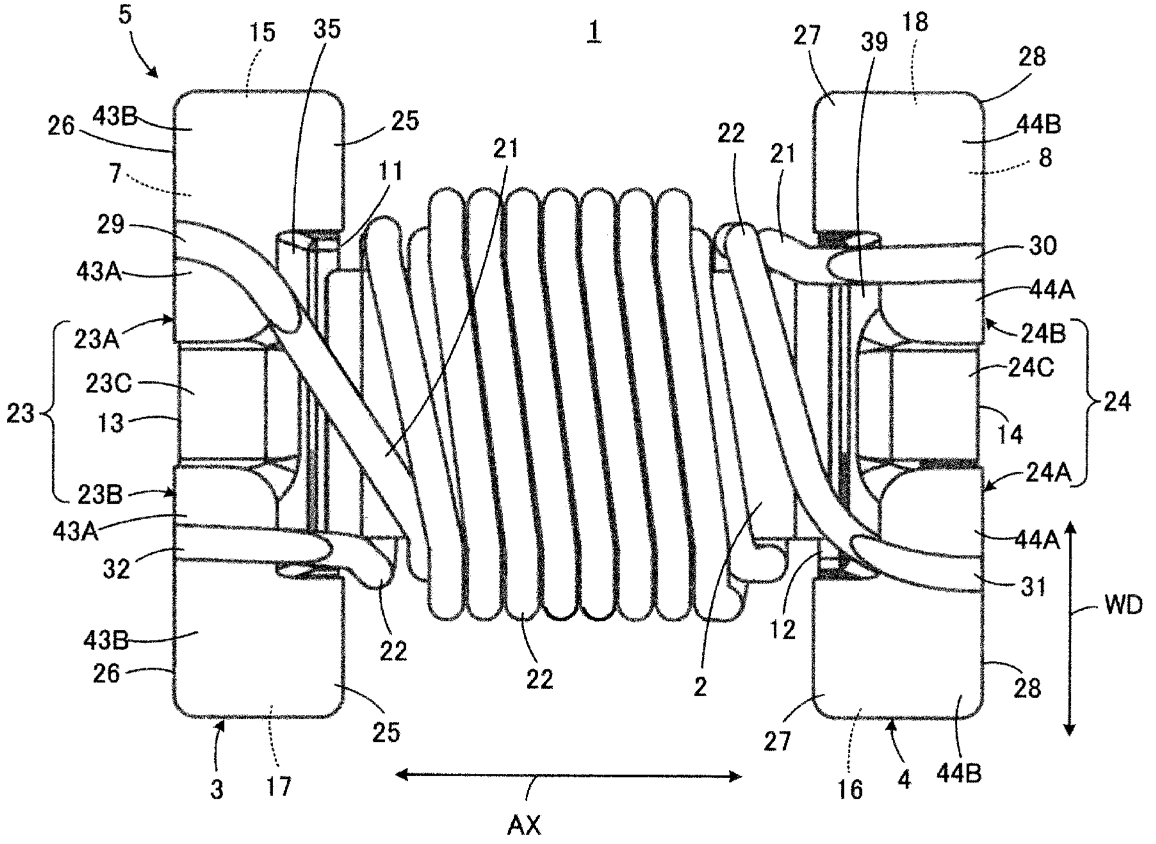
FIG. 2 is a bottom view illustrating the exterior of the coil component 1 illustrated in FIG. 1 when viewed from the side where the mounting surfaces 7 and 8 are located.
Figure 3:
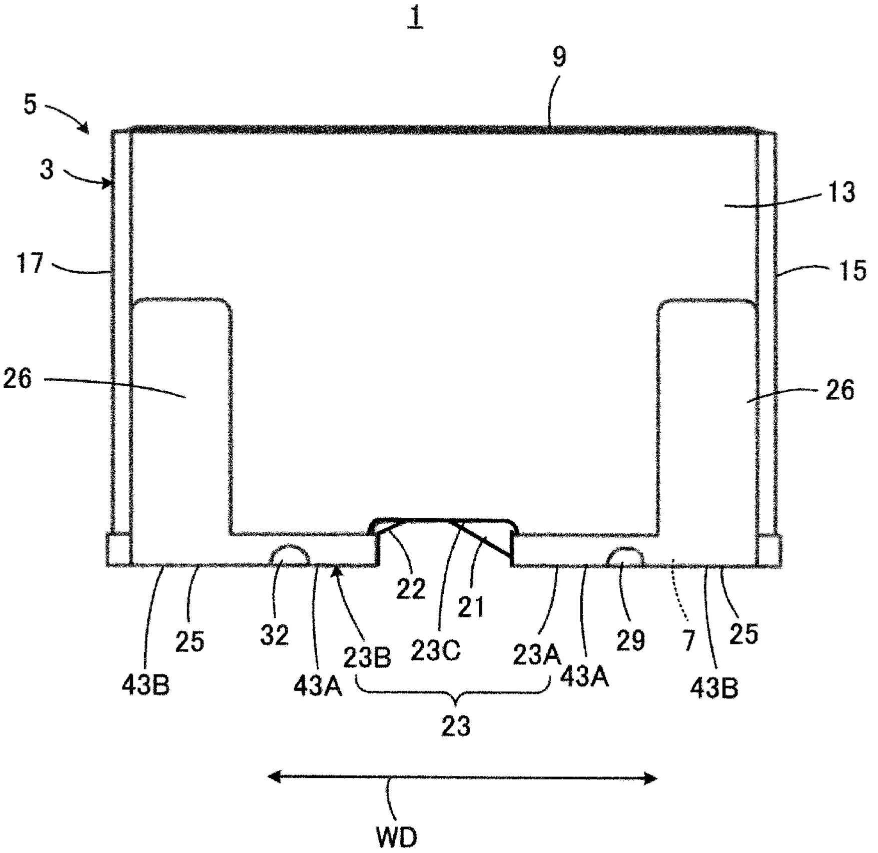
FIG. 3 is a left side view illustrating the exterior of the coil component 1 illustrated in FIG. 1 when the mounting surfaces 7 and 8 face downward.

As specifically illustrated in FIG. 2, when viewed from the side where the mounting surface 7 or 8 is located, the interior angle between the axial direction AX and the direction in which the part of the first wire 21 extended from the winding core portion 2 to the first flattened portion 29 extends is smaller than the interior angle between the axial direction AX and the direction in which the first wire 21 extends over the winding core portion 2. Similarly, when viewed from the side where the mounting surface 7 or 8 is located, the interior angle between the axial direction AX and the direction in which the part of the second wire 22 extended from the winding core portion 2 to the first flattened portion 31 extends is smaller than the interior angle between the axial direction AX and the direction in which the second wire 22 extends over the winding core portion 2.

More specifically, the interior angle between the axial direction AX and the direction in which the part of the first wire 21 extended from the winding core portion 2 to the first flattened portion 29 extends is about 60°. The interior angle between the axial direction AX and the direction in which the second wire 22 extends over the winding core portion 2 is about 80°. Thus, the former angle is smaller than the latter angle.

Similarly, the interior angle between the axial direction AX and the direction in which the part of the second wire 22 extended from the winding core portion 2 to the first flattened portion 31 extends is about 70°. The interior angle between the axial direction AX and the direction in which the second wire 22 extends over the winding core portion 2 is about 80°. Thus, the former angle is smaller than the latter angle.

Such a configuration contributes to a reduction in the stress generated in the first flattened portions 29 and 31.

In addition, the slopes 35 and 39 are formed so as to cause the parts of the wires 35 and 39 over the part from the second middle position 34 to the first middle position 33 and over the part from the second middle position 38 to the first middle position 37 to each have a shape that becomes thinner toward the corresponding tip end. Thus, it is possible to reduce, during thermocompression bonding, the concentration of stress on the wires 21 and 22 at parts in the vicinities of the edge lines where the mounting surfaces 7 and 8 and the respective inner end surfaces 11 and 12 of the flange portions 3 and 4 meet each other and to cause the wires 21 and 22 to be less likely to be broken at these parts.

In the present embodiment, the two first terminal electrodes 23A and 23B each include a wire connection portion 43A, to which the wire 21 or 22 is connected and, more specifically, where the first flattened portion 29 or the second flattened portion 32 is located, and a substrate mounting portion 43B, which is to be connected to a mounting substrate. Each of the substrate mounting portions 43B of the two first terminal electrodes 23A and 23B is allocated so as to be disposed outside a corresponding one of the wire connection portions 43A of the two first terminal electrodes 23A and 23B in the width direction WD.

Similarly, the two second terminal electrodes 24A and 24B each include a wire connection portion 44A, to which the wire 21 or 22 is connected and, more specifically, where the first flattened portion 31 or the second flattened portion 30 is located, and a substrate mounting portion 44B, which is to be connected to a mounting substrate. Each of the substrate mounting portions 44B of the two second terminal electrodes 24A and 24B is allocated so as to be disposed outside a corresponding one of the wire connection portions 44A of the two first terminal electrodes 24A and 24B in the width direction WD.

The above configuration achieves the following effects. Generally, when the core 5 is bent due to the expansion and shrinkage difference in the axial direction AX between a mounting substrate and the core 5, the flange portions 3 and 4 are caused to follow the mounting substrate, thus generating stress in the winding core portion 2 through the mounting surfaces 7 and 8 of the flange portions 3 and 4 facing the mounting substrate. In the above configuration, the substrate mounting portions 43B and 44B are located outside the wire connection portions 44A and 44A in the width direction WD. Thus, the above configuration is capable of increasing the distance from each of the substrate mounting portions 43B and 44B to the winding core portion 2 and is capable of increasing the bending strength of the winding core portion 2.

Conversely, when the substrate mounting portions 43B and 44B are located inside in the width direction WD and stress is concentrated on each part where the winding core portion 2 and the respective inner end surfaces 11 and 12 of the flange portions 3 and 4 are connected, cracks may be generated. Disposing the substrate mounting portions 43B and 44B outside enables cracks to be less likely to be generated.

Description will focus on the respective first flattened portions 29 and 31 of the wires 21 and 22. When viewed from the side where the mounting surfaces 7 and 8 are located, the center axis of a part of each of the first flattened portions 29 and 31 closer to the winding core portion 2 and the center axis of a part of a corresponding one of the first flattened portions 29 and 31 closer to the tip end extend in different directions. More specifically, when viewed from the side where the mounting surfaces 7 and 8 are located, the first flattened portions 29 and 31 curve, and the center axis of the part of each of the first flattened portions 29 and 31 closer to the tip end extends in the direction parallel to the axial direction AX. It is to be particularly noted that the first flattened portions 29 and 31 each have a shape curved on the terminal electrode 23A or 24A.

In this manner, when viewed from the side where the mounting surfaces 7 and 8 are located, the center axis of the part of each of the first flattened portions 29 and 31 closer to the winding core portion 2 and the center axis of the part of a corresponding one of the first flattened portions 29 and 31 closer to the tip end extend in different directions. Thus, it is possible to freely select an orientation and a position of the part of each of the first flattened portions 29 and 31 closer to the tip end. As a result, it is possible to select an orientation and a position of the part of each of the first flattened portions 29 and 31 closer to the tip end such that the area of the substrate mounting portion 43B can be wide in the first terminal electrodes 23A and 23B. In particular, the center axis of the part of each of the first flattened portions 29 and 31 closer to the tip end extends in the direction parallel to the axial direction AX. Thus, it is possible to avoid disposing the first flattened portions 29 and 31 so as to traverse the first terminal electrodes 23A and 23B located on the respective mounting surfaces 7 and 8 in a diagonal direction.

On the other hand, when viewed from the side where the mounting surfaces 7 and 8 are located, the second flattened portions 30 and 32 are extended from the winding core portion 2 in the axial direction AX and, more specifically, in the direction parallel to the axial direction AX or a direction substantially parallel to the axial direction AX. The second flattened portions 30 and 32 extend in a direction substantially the same as the direction described above and are connected to the wire connection portion 44A of the respective second terminal electrodes 24A and 24B located inside in the width direction WD. Thus, the substrate mounting portion 44B of the respective second terminal electrodes 24A and 24B located outside in the width direction WD can have a wide area.

Preferably, the specific shape in which the center axis of the part of each of the first flattened portions 29 and 31 closer to the winding core portion 2 and the center axis of the part of a corresponding one of the first flattened portions 29 and 31 closer to the tip end extend in different directions is formed by a process of subjecting the end portions of the wires 21 and 22 to thermocompression bonding to form the first flattened portions 29 and 31. The process will be more specifically described as follows:

(1) First, the wire 21 is disposed on the first terminal electrode 23A. Then, the wire 21 is directed so as to traverse the first terminal electrode 23A in a diagonal direction thereof.

(2) Subsequently, a heater chip is brought close to the first terminal electrode 23A and is preheated to a temperature equal to or higher than the softening temperature of, for example, copper forming the center wire material of the wire 21.

(3) Subsequently, the heater chip is pressed against the wire 21 to flatten the wire 21. At the same time, the heater chip is rotated. Then, the direction in which the heater chip is rotated is controlled, thus enabling the direction in which the first flattened portion 29 is directed to be controlled to form the specific shape in which the center axis of the part of the first flattened portion 29 closer to the winding core portion 2 and the center axis of the part of the first flattened portion 29 closer to the tip end extend in different directions.

A thermocompression bonding process, similar to the above process, for forming the other first flattened portion 31 is performed.

Preferably, when viewed from the side where the mounting surfaces 7 and 8 are located, the interior angle between the center axis of the part of each of the first flattened portions 29 and 31 closer to the winding core portion 2 and the center axis of the part of a corresponding one of the first flattened portions 29 and 31 closer to the tip end is an obtuse angle. This enables a reduction in stress likely to be concentrated on the first flattened portions 29 and 31.

Each of the end surface electrode portions 26 and 28 is a portion where a solder fillet is formed when the coil component 1 is mounted on a mounting substrate. The end surface electrode portions 26 and 28 are respectively located outside, in the width direction WD, the wire connection portions 43A and 43B of the terminal electrodes 23A, 23B, 24A, and 24B. More specifically, when viewed in the axial direction AX, the end surface electrode portions 26 and 28 are located so as not to overlap the winding core portion 2. This configuration also enables cracks caused by thermal shock due to the expansion and shrinkage difference in the axial direction AX between a mounting substrate and the core 5 to be less likely to be generated. In addition, this configuration enables an increase in the bending strength of the winding core portion 2.

In addition, the first end surface electrode portions 26 are located apart from each of the first side surface 15 and the second side surface 17 of the first flange portion 3. Similarly, the second end surface electrode portions 28 are located apart from each of the first side surface 16 and the second side surface 18 of the second flange portion 4. With this configuration, when the coil component 1 is mounted on a mounting substrate, it is possible to inhibit solder fillets from being formed so as to spread to the side surfaces 15 and 17 of the first flange portion 3 and the side surfaces 16 and 18 of the second flange portion 4. Thus, it is possible to mount the coil component 1 on a mounting substrate so as to be close to a different component.

Figure 4:
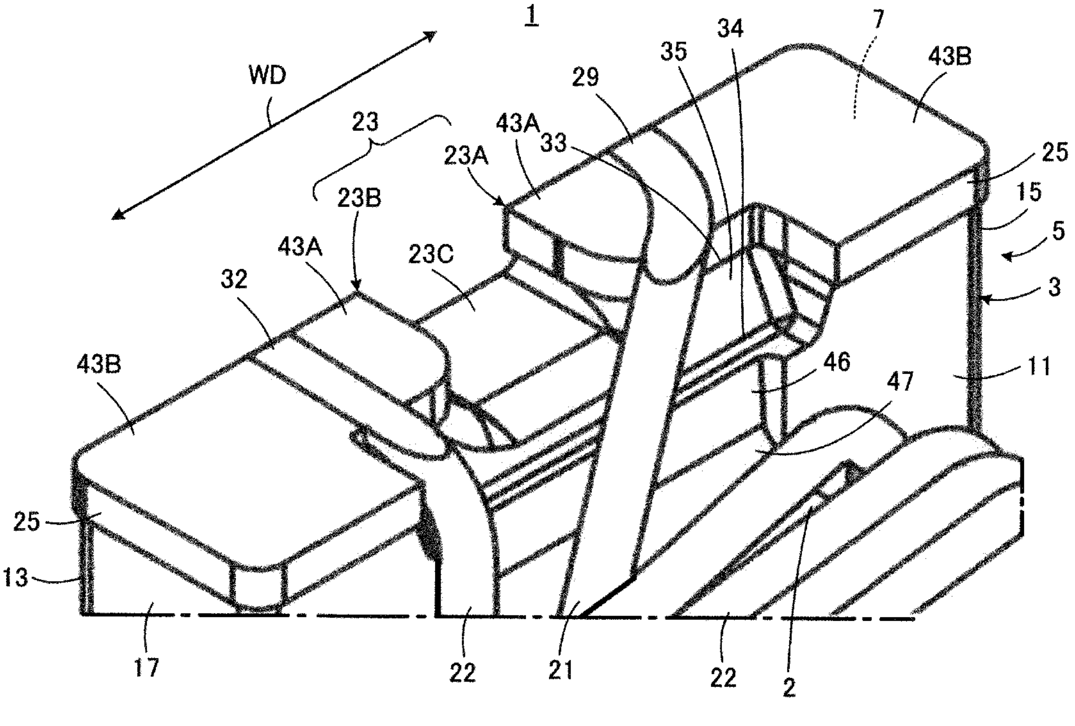
FIG. 4 is a partial enlarged perspective view illustrating the coil component 1 illustrated in FIG. 1.
Figure 5:
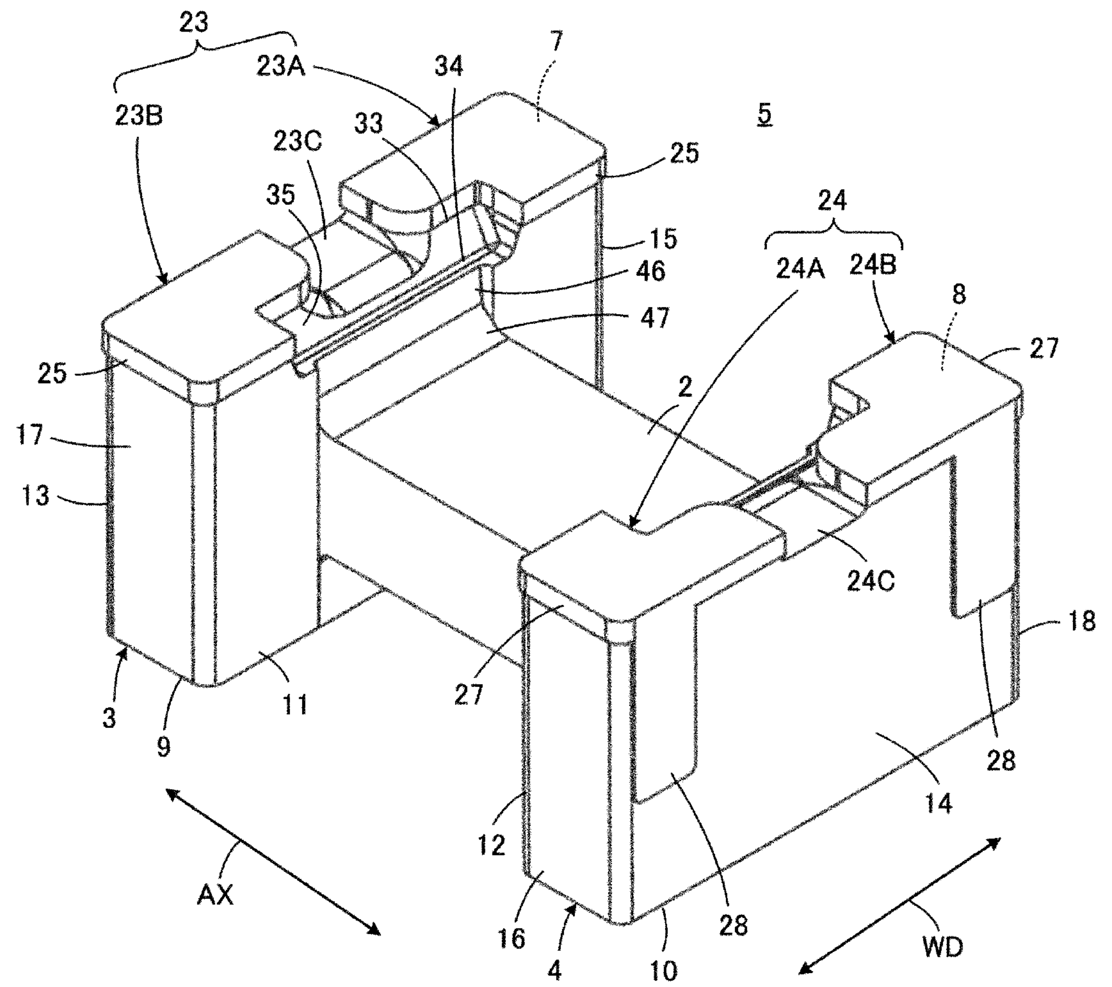
FIG. 5 is a perspective view illustrating the exterior of a core 5 included in the coil component 1 illustrated in FIG. 1 when the mounting surfaces 7 and 8 face upward.
Figure 6:
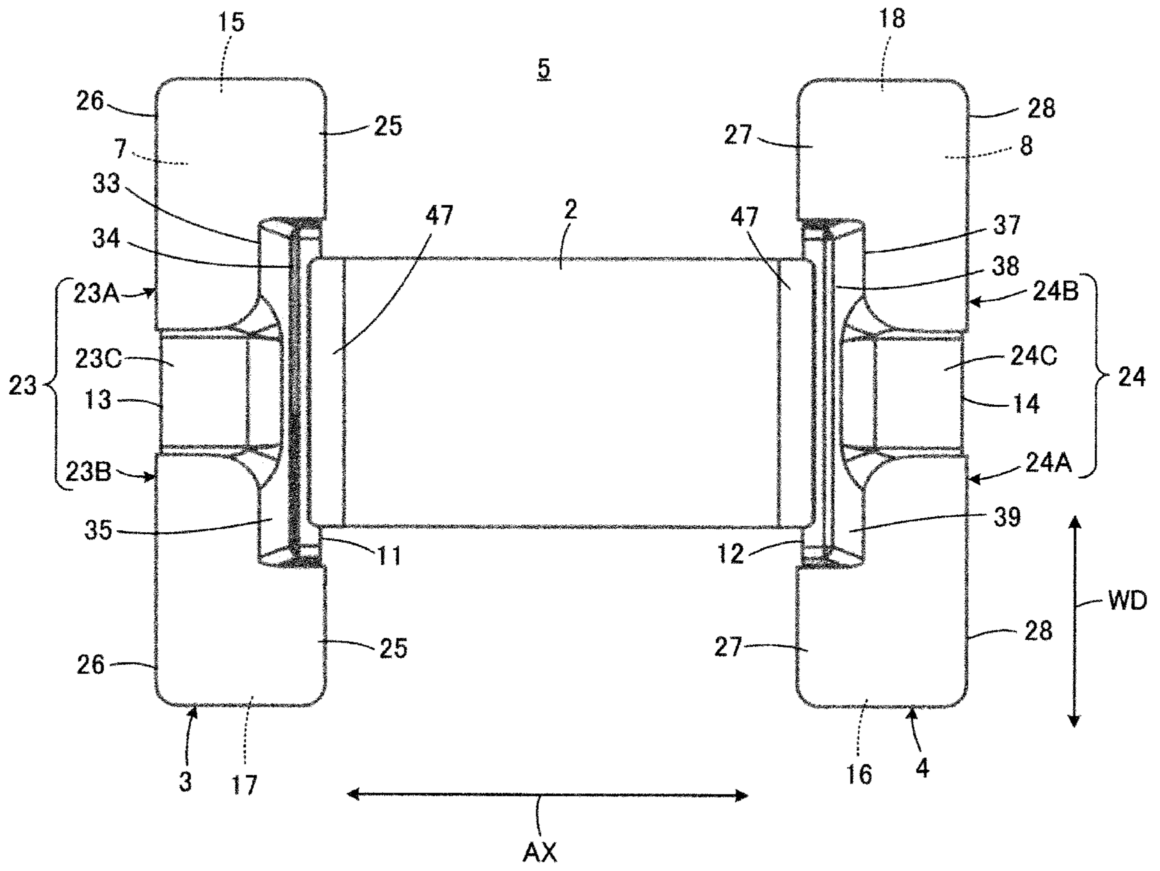
FIG. 6 is a bottom view illustrating the exterior of the core 5 illustrated in FIG. 5 when viewed from the side where the mounting surfaces 7 and 8 are located.

As FIGS. 4 and 5 illustrate the configuration of the first flange portion 3, a recessed portion 46, which extends in the width direction WD of the winding core portion 2, is provided at each part where the winding core portion 2 and the flange portions 3 and 4 are connected. The recessed portion 46 is provided so as to penetrate the inner end surface 11 of the flange portion 3 and forms an inclined surface 47 closer to the winding core portion 2. The inclined surface 47 is formed by a flat surface in the figures but may be formed by a curved surface. The inclined surface 47 is capable of scattering stress concentrated between the winding core portion 2 and the flange portion 3, thus enabling cracks to be less likely to be generated.

If the inclined surface 47 is located on the winding core portion 2 and the recessed portion 46 is not provided, the flat area of the peripheral surface of the winding core portion 2 is small, and the region where winding can be performed on the winding core portion 2 is thus narrowed. On the other hand, as described above, providing the recessed portion 46 so as to penetrate the inner end surface 11 of the flange portion 3 enables the region where winding can be performed to be inhibited from being narrowed even if the inclined surface 47 is provided.

Figure 7:
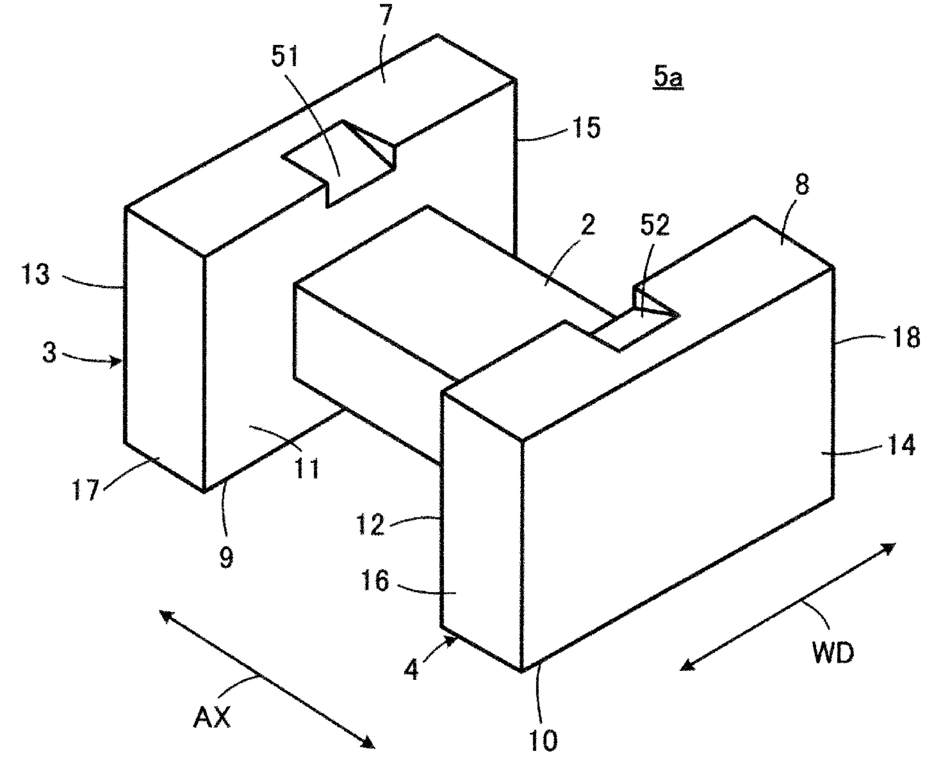
FIG. 7 is a perspective view illustrating the exterior of a core **5*a* included in a coil component according to Embodiment 2 of the present disclosure when the mounting surfaces 7 and 8** face upward.
Figure 8:
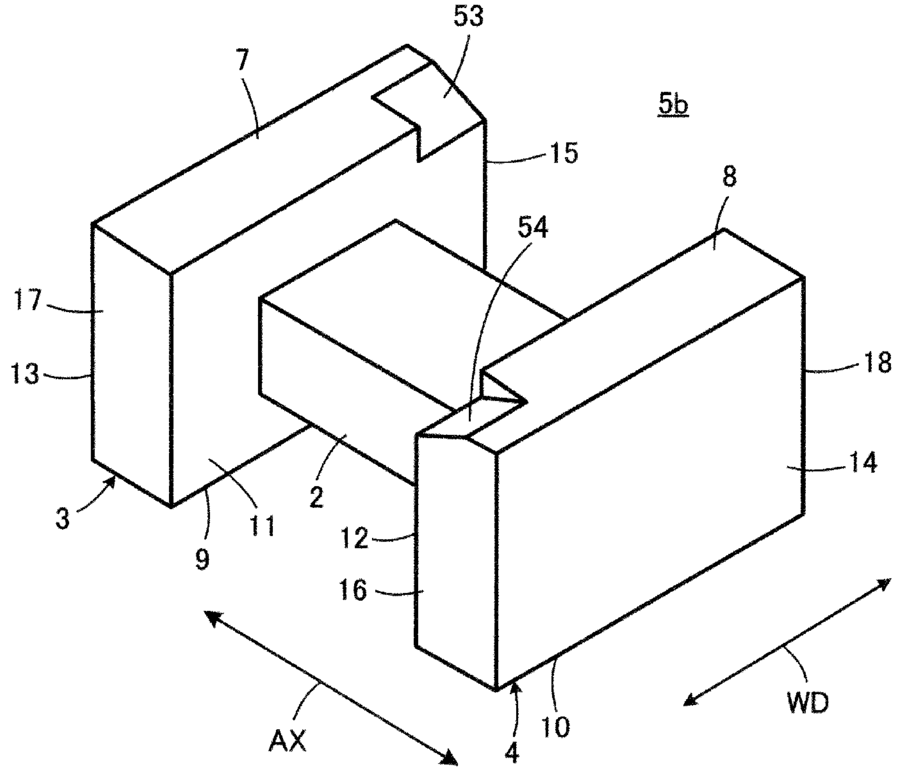
FIG. 8 is a perspective view illustrating the exterior of a core **5*b* included in a coil component according to Embodiment 3 of the present disclosure when the mounting surfaces 7 and 8** face upward.
Figure 9:
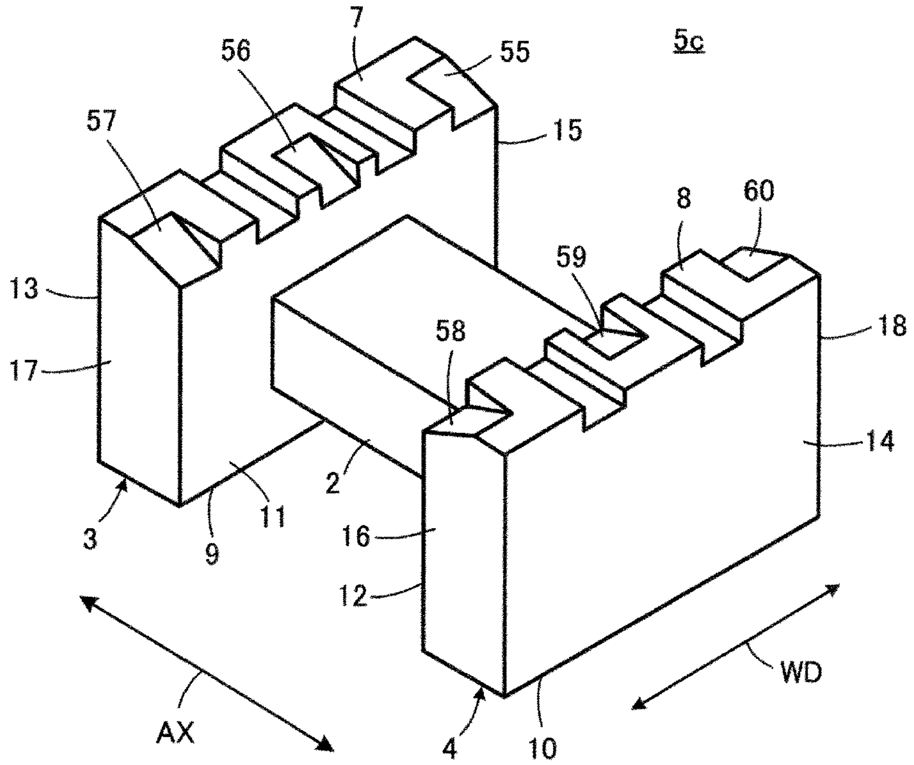
FIG. 9 is a perspective view illustrating the exterior of a core **5*c* included in a coil component according to Embodiment 4 of the present disclosure when the mounting surfaces 7 and 8 face upward.
Figure 10:
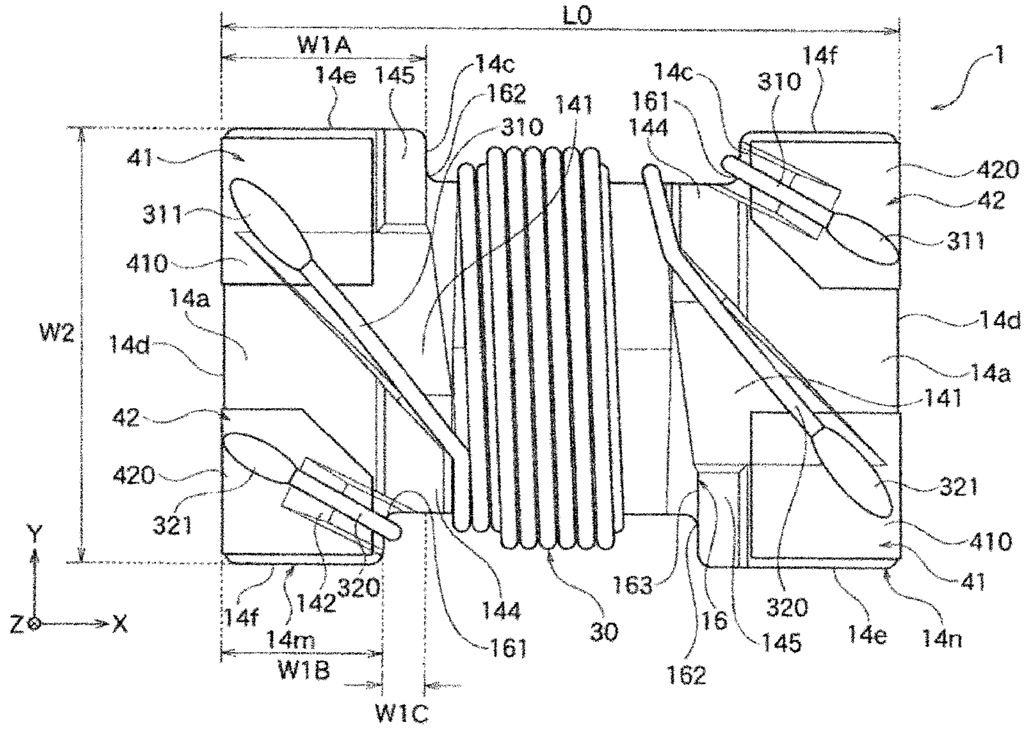
FIG. 10** is a diagram of a copy of FIG. 1B in Japanese Unexamined Patent Application Publication No. 2021-39986.

FIGS. 7 to 9 are perspective views illustrating the exteriors of cores included in coil components according to Embodiments 2 to 4 of the present disclosure when viewed from the side where mounting surfaces are located. These figures do not illustrate wires and thus do not illustrate the flattened portions of the wires that are characteristic components of the present disclosure and a state in which the center axis of a part of a certain flattened portion closer to a winding core portion and the center axis of a part of the certain flattened portion closer to the tip end extend in different directions. The components illustrated in FIGS. 7 to 9 corresponding to components illustrated in FIG. 5 have the same reference signs, and duplicate descriptions are omitted.

A core 5*a* illustrated in FIG. 7 is used for a coil component including one wire. A slope 51 is provided at the center of the first flange portion 3 in the width direction WD. A slope 52 is provided at the center of the second flange portion 4 in the width direction WD. The slopes 51 and 52 each indicate a position where a wire is extended and a position where a terminal electrode is provided. The core 5*a* enables formation of a structure symmetrical relative to the part of each of the first flange portion 3 and the second flange portion 4 to which a wire is pressure-bonded, thus improving the mountability of a coil component.

Similarly to the core 5*a* illustrated in FIG. 7, a core 5*b* illustrated in FIG. 8 is used for a coil component including one wire. A slope 53 is provided at an end portion of the first flange portion 3 in the width direction WD. A slope 54 is provided at an end portion of the second flange portion 4 in the width direction WD. The slope 53 provided at the first flange portion 3 and the slope 54 provided at the second flange portion 4 are disposed so as to face each other in a diagonal direction. The slopes 53 and 54 each indicate a position where a wire is extended and a position where a terminal electrode is provided. The core 5*b* enables facilitation of wire routing.

A core 5*c* illustrated in FIG. 9 is used for a coil component including three wires, such as a three-phase common mode choke coil. Three slopes 55, 56, and 57 are provided at the first flange portion 3 so as to be arranged in the width direction WD. Three slopes 58, 59, and 60 are provided at the second flange portion 4 so as to be arranged in the width direction WD. The slopes 55 to 60 each indicate a position where a wire is extended and a position where a terminal electrode is provided.

A core that is a modified example of the core 5*c* illustrated in FIG. 9 may be used for a coil component including four or more wires. Four or more slopes thereof may be provided at each of the first flange portion and the second flange portion so as to be arranged in the width direction WD.

The present disclosure has been described above with reference to the illustrated embodiments. In addition, various embodiments can be made within the scope of the present disclosure.

For example, in Embodiment 1, the first flattened portions 29 and 31 are provided at the respective first end portions of the wires 21 and 22, and the second flattened portions 30 and 32 are provided at the respective second end portions of the wires 21 and 22. However, the first flattened portions 29 and 31 may be provided without provision of the second flattened portions 30 and 32.

In relation to the above, in Embodiment 1, the slope 35 is provided so as to be in contact with both the first flattened portion 29 and the second flattened portion 32, and the slope 39 is provided so as to be in contact with both the first flattened portion 31 and the second flattened portion 30.

However, the slopes may be provided so as to be in contact with only the respective first flattened portions.

Although not illustrated, a top plate may be provided so as to connect respective top surfaces of a first flange portion and a second flange portion of a core. When the core and the top plate are each made of a magnetic material, the core and the top plate form a closed magnetic circuit. A resin coating may be provided instead of the top plate.

The scope of the present disclosure is not limited to the above embodiments.

Configurations of different embodiments may be partially replaced or combined within the scope of the present disclosure.

What is claimed is:

1. A coil component comprising:

a core including a winding core portion, a first flange portion, and a second flange portion;

at least one wire wound around the winding core portion;

wherein the winding core portion extends in an axial direction, the first flange portion and the second flange portion are at respective end portions of the winding core portion located opposite to each other in the axial direction, the first flange portion and the second flange portion each includes a mounting surface, a top surface, an inner end surface, an outer end surface, a first side surface, and a second side surface, the mounting surface facing, when the coil component is mounted on a mounting substrate, a side where the mounting substrate is located, the top surface facing opposite to the mounting surface, the inner end surface connecting the mounting surface and the top surface and facing a side where the winding core portion is located, an end portion of the winding core portion in the axial direction being located at the inner end surface, the outer end surface facing opposite to the inner end surface, and the first side surface and the second side surface connecting the inner end surface and the outer end surface and facing opposite to each other;

a first terminal electrode on at least the mounting surface of the first flange portion; and a second terminal electrode on at least the mounting surface of the second flange portion, wherein the wire includes a first end portion extended from the winding core portion in an oblique direction relative to the axial direction when viewed from a side where the mounting surface is located, a first flattened portion is in at least a part of the first end portion and is connected to one of the first terminal electrode and the second terminal electrode, the first flattened portion has a shape flattened such that a direction of a major axis of a cross sectional shape of the first flattened portion is directed in a direction along the mounting surface, a slope is at a boundary portion between the mounting surface and the inner end surface of the first flange portion and extends so as to connect a first middle position and a second middle position, the first middle position being located between the inner end surface and the outer end surface in a direction along the mounting surface, the second middle position being located between the mounting surface and the top surface in a direction along the inner end surface, the first flattened portion has a shape that becomes thinner from the winding core portion toward a tip end of the wire, and when viewed from the side where the mounting surface is located, a center axis of a part of the first flattened portion closer to the winding core portion extend in different direction from a center axis of a part of the first flattened portion closer to the tip end of the wire.

2. The coil component according to claim 1, wherein when viewed from the side where the mounting surface is located, the center axis of the part of the first flattened portion closer to the tip end of the wire extends in a direction parallel to the axial direction.

3. The coil component according to claim 1, wherein the first end portion of the wire is extended from the winding core portion so as to traverse a center axis of the winding core portion when viewed from the side where the mounting surface is located.

4. The coil component according to claim 1, wherein when viewed from the side where the mounting surface is located, an interior angle between the axial direction and a direction in which a part of the wire extended from the winding core portion to the first flattened portion extends is smaller than an interior angle between the axial direction and a direction in which the wire extends over the winding core portion.

5. The coil component according to claim 1, wherein the wire further includes a second end portion extended from the winding core portion in a direction along the axial direction when viewed from the side where the mounting surface is located, a second flattened portion is in at least a part of the second end portion and is connected to another of the first terminal electrode and the second terminal electrode, and the second flattened portion has a shape flattened such that a direction of a major axis of a cross sectional shape of the second flattened portion is directed in a direction along the mounting surface.

6. The coil component according to claim 1, wherein when a direction in which the mounting surface extends and that is orthogonal to the axial direction of the winding core portion is a width direction, two of the first terminal electrodes are on the first flange portion and arranged in the width direction, and two of the second terminal electrodes are on the second flange portion and arranged in the width direction.

7. The coil component according to claim 6, wherein the first terminal electrodes and the second terminal electrodes each include a wire connection portion to which the wire is connected, and a substrate mounting portion configured to be connected to the mounting substrate, each of the substrate mounting portions of the two of the first terminal electrodes is disposed outside a corresponding one of the wire connection portions of the two of the first terminal electrodes in the width direction, and each of the substrate mounting portions of the two of the second terminal electrodes is disposed outside a corresponding one of the wire connection portions of the two of the second terminal electrodes in the width direction.

8. The coil component according to claim 1, wherein a diameter of a part, over the winding core portion, of the wire is from 100 μm to 300 μm.

9. The coil component according to claim 1, wherein a diameter of a part, over the winding core portion, of the wire is from 5% to 15% of a length of the winding core portion in the axial direction.

10. The coil component according to claim 1, wherein when viewed from the side where the mounting surface is located, an interior angle between the center axis of the part of the first flattened portion closer to the winding core portion and the center axis of the part of the first flattened portion closer to the tip end of the wire is an obtuse angle.

11. The coil component according to claim 1, wherein the first terminal electrode further includes a first end surface electrode portion which extends from the mounting surface to the outer end surface of the first flange portion, and the second terminal electrode further includes a second end surface electrode portion which extends from the mounting surface to the outer end surface of the second flange portion.

12. The coil component according to claim 11, wherein when viewed in the axial direction, the first end surface electrode portion and the second end surface electrode portion are located so as not to overlap the winding core portion.

13. The coil component according to claim 11, wherein the first end surface electrode portion and the second end surface electrode portion are spaced apart from each of the first side surface and the second side surface.

14. A coil component comprising:

a core including a winding core portion, a first flange portion, and a second flange portion, at least one wire wound around the winding core portion;

wherein the winding core portion extends in an axial direction, the first flange portion and the second flange portion are at respective end portions of the winding core portion located opposite to each other in the axial direction, the first flange portion and the second flange portion each includes a mounting surface, a top surface, an inner end surface, an outer end surface, a first side surface, and a second side surface, the mounting surface facing, when the coil component is mounted on a mounting substrate, a side where the mounting substrate is located, the top surface facing a side opposite to the side that the mounting surface faces, the inner end surface connecting the mounting surface and the top surface and facing a side where the winding core portion is located, an end portion of the winding core portion in the axial direction being located at the inner end surface, the outer end surface facing a side opposite to the side that the inner end surface faces, the first side surface and the second side surface connecting the inner end surface and the outer end surface and facing respective directions opposite to each other;

a first terminal electrode on at least the mounting surface of the first flange portion; and a second terminal electrode on at least the mounting surface of the second flange portion, wherein the wire includes a first end portion extended from the winding core portion in an oblique direction relative to the axial direction when viewed from a side where the mounting surface is located, a first flattened portion is in at least a part of the first end portion and is connected to one of the first terminal electrode and the second terminal electrode, the first flattened portion has a shape flattened such that a direction of a major axis of a cross sectional shape of the first flattened portion is directed in a direction along the mounting surface, and when viewed from the side where the mounting surface is located, a center axis of a part of the first flattened portion closer to the winding core portion and a center axis of a part of the first flattened portion closer to a tip end of the wire extend in different directions, and the center axis of the part of the first flattened portion closer to the tip end of the wire extends in a direction parallel to the axial direction.

15. The coil component according to claim 14, wherein the first flattened portion has a shape that becomes thinner from the winding core portion toward the tip end of the wire.

16. The coil component according to claim 14, wherein the first end portion of the wire is extended from the winding core portion so as to traverse a center axis of the winding core portion when viewed from the side where the mounting surface is located.

17. The coil component according to claim 14, wherein when viewed from the side where the mounting surface is located, an interior angle between the axial direction and a direction in which a part of the wire extended from the winding core portion to the first flattened portion extends is smaller than an interior angle between the axial direction and a direction in which the wire extends over the winding core portion.

18. The coil component according to claim 14, wherein the wire further includes a second end portion extended from the winding core portion in a direction along the axial direction when viewed from the side where the mounting surface is located, a second flattened portion is in at least a part of the second end portion and is connected to another of the first terminal electrode and the second terminal electrode, and the second flattened portion has a shape flattened such that a direction of a major axis of a cross sectional shape of the second flattened portion is directed in a direction along the mounting surface.

19. The coil component according to claim 14, wherein when a direction in which the mounting surface extends and that is orthogonal to the axial direction of the winding core portion is a width direction, two of the first terminal electrodes are on the first flange portion and arranged in the width direction, and two of the second terminal electrodes are on the second flange portion and arranged in the width direction.

20. The coil component according to claim 14, wherein a diameter of a part, over the winding core portion, of the wire is from 100 μm to 300 μm.

* * * * *